(12) United States Patent
Narasimhan et al.

(10) Patent No.: US 8,149,810 B1
(45) Date of Patent: Apr. 3, 2012

(54) DATA RATE ADAPTATION IN MULTIPLE-IN-MULTIPLE-OUT SYSTEMS

(75) Inventors: Ravi Narasimhan, Los Altos, CA (US); Hemanth Sampath, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1980 days.

(21) Appl. No.: 10/620,024

(22) Filed: Jul. 14, 2003

Related U.S. Application Data

(60) Provisional application No. 60/447,448, filed on Feb. 14, 2003.

(51) Int. Cl.
*H04J 1/00* (2006.01)

(52) U.S. Cl. ............... 370/343; 370/329; 455/67.13; 455/101; 455/115.1; 455/452.2

(58) Field of Classification Search .......... 370/329, 370/343; 455/452, 67.13, 452.2, 101, 115.1
See application file for complete search history.

(56) References Cited

U.S. PATENT DOCUMENTS

| | | | |
|---|---|---|---|
| 5,345,599 A | 9/1994 | Paulraj et al. | |
| 5,483,676 A | 1/1996 | Mahany et al. | |
| 6,351,499 B1 | 2/2002 | Paulraj et al. | |
| 6,377,636 B1 | 4/2002 | Paulraj et al. | |
| 6,452,981 B1 | 9/2002 | Raleigh et al. | |
| 6,499,008 B2 | 12/2002 | Miet | |
| 6,618,591 B1 * | 9/2003 | Kalliokulju et al. | ....... 455/452.2 |
| 6,633,616 B2 | 10/2003 | Crawford | |
| 6,675,012 B2 | 1/2004 | Gray | |
| 6,687,492 B1 | 2/2004 | Sugar et al. | |
| 6,775,548 B1 | 8/2004 | Rong et al. | |
| 6,801,501 B1 | 10/2004 | Knightly et al. | |
| 6,801,580 B2 | 10/2004 | Kadous | |
| 6,826,528 B1 | 11/2004 | Wu et al. | |
| 7,032,157 B2 | 4/2006 | Kim et al. | |
| 7,046,963 B2 * | 5/2006 | Luo et al. | ........... 455/67.11 |
| 7,075,913 B1 | 7/2006 | Yavuz et al. | |
| 7,302,009 B2 | 11/2007 | Walton et al. | |
| 7,408,976 B1 | 8/2008 | Narashinham et al. | |
| 7,532,563 B1 | 5/2009 | Shirali et al. | |
| 2002/0056066 A1 * | 5/2002 | Gesbert et al. | ............ 714/759 |
| 2002/0183010 A1 | 12/2002 | Catreux et al. | |
| 2002/0196842 A1 | 12/2002 | Onggosanusi et al. | |
| 2003/0003863 A1 | 1/2003 | Thielecke et al. | |
| 2003/0065712 A1 | 4/2003 | Cheung et al. | |

(Continued)

FOREIGN PATENT DOCUMENTS

WO    WO 03/001726    1/2003

OTHER PUBLICATIONS

Goldsmith, et al., "Adaptive Coded Modulation for Fading Channels", May 1998, IEEE Transactions on Communications, vol. 46, No. 5, pp. 595-602.

(Continued)

*Primary Examiner* — Dwayne Bost
*Assistant Examiner* — Amancio Gonzalez

(57) ABSTRACT

A transmit data rate adaptation method in a multiple-in-multiple-out (MIMO) system with a first transceiver and a second transceiver. The first transceiver transmits signals to the second transceiver. The second transceiver analyzes channel quality of the received signals and uses link adaptation to generate a shortlist of transmit modes to send back to the first transceiver. The first transceiver cycles through the shortlist of transmit modes to find an optimum transmit mode.

224 Claims, 8 Drawing Sheets

U.S. PATENT DOCUMENTS

| | | | |
|---|---|---|---|
| 2003/0086486 | A1 | 5/2003 | Graziano et al. |
| 2003/0100265 | A1* | 5/2003 | Wang et al. ............... 455/67.3 |
| 2003/0231655 | A1 | 12/2003 | Kelton et al. |
| 2004/0017773 | A1 | 1/2004 | Piche et al. |
| 2004/0082356 | A1* | 4/2004 | Walton et al. ............... 455/522 |
| 2004/0153951 | A1 | 8/2004 | Walker et al. |
| 2004/0160922 | A1 | 8/2004 | Nanda et al. |
| 2004/0160979 | A1 | 8/2004 | Pepin et al. |
| 2004/0203456 | A1* | 10/2004 | Onggosanusi et al. ..... 455/67.13 |
| 2005/0027840 | A1 | 2/2005 | Theobold et al. |
| 2005/0099975 | A1* | 5/2005 | Catreux et al. ............... 370/329 |
| 2005/0117543 | A1* | 6/2005 | Heath et al. ............... 370/329 |
| 2005/0143027 | A1 | 6/2005 | Kiddink et al. |
| 2005/0249157 | A1 | 11/2005 | Qian et al. |
| 2005/0254592 | A1 | 11/2005 | Naguib et al. |

OTHER PUBLICATIONS

Catreux, et al., "Adaptive Modulation and MIMO Coding for Broadband Wireless Data Networks", Jun. 2002, IEEE Communications Magazine, pp. 108-115.

Xin, et al., "Space-Time Constellation-Rotating Codes Maximizing Diversity and Coding Gains", 2001, IEEE, pp. 455-459.

Foschini, et al., "On Limits of Wireless Communications in a Fading Environment when Using Multiple Antennas", 1998, Wireless Personal Communications, pp. 311-335.

Tarokh, et al., "Space-Time Block Codes from Orthogonal Designs", Jul. 1999, IEEE Transactions on Information Theory, vol. 45, No. 5, pp. 1456-1467.

Hayes, et al., "Part 11: Wireless LAN Medium Access Control (MAC) and Physical Layer (PHY) specifications: High-speed Physical Layer in the 5 Ghz Band", IEEE, Supplement to IEEE Standard for Information Technology, Std. 802.11a, pp. i-viii, pp. 1-83, 1999.

Hayes, et al., "Part 11: Wireless LAN Medium Access Control (MAC) and Physical Layer (PHY) specifications", International Standard, ISO/IEC 8802-11, ANSI/IEEE Std. 802.11, pp. i-xvi, pp. 1-512, 1999.

IEEE Computer Society, "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 Ghz Band", IEEE Std 802.11b—1999.

IEEE Computer Society, "IEEE Standard for Information Technology—Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band", IEEE P802.11g/D8.2, Apr. 2003.

IEEE Computer Society, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 5: Spectrum and Transmit Power Management Extensions in the 5 GHz Band in Europe", IEEE P802.11h—2003.

IEEE Computer Society, "TGn Sync Proposal Technical Specification", IEEE Std 802.11n—First Edition, May 2005.

IEEE Computer Society, "Part 16: Air Interface for Fixed Broadband Wireless Access Systems", IEEE Std 802.16-2004.

IEEE Computer Society, "Draft 802.20 Permanent Document : System Requirements for IEEE 802.20 Mobile Broadband Wireless Access Systems—Version 14", IEEE 802.20-PD-06, Jul. 2004.

Sampath, et al. U.S. Appl. No. 10/834,745, filed Apr. 28, 2004.

Shirali et al., U.S. Appl. No. 10/998,838, filed Nov. 12, 2004.

Sampath et al., U.S. Appl. No. 10/734,440, filed Dec. 11, 2003.

Shirali et al., U.S. Appl. No. 10/988,318, filed Nov. 12, 2004.

* cited by examiner

FIG. 6A

| Threshold Mean SINR | Modes | |
|---|---|---|
| $\overline{\mu s,r,m1}$ | Mode 1 | ⎫ 108 |
| $\overline{\mu s,r,m2}$ | Mode 2 | |
| $\overline{\mu s,r,m3}$ | Mode 3 | |
| 0 0 0 | 0 0 0 | |

FIG. 6B

| | | | |
|---|---|---|---|
| S=1 | $\overline{\mu s,r,m1}$ $\overline{\mu s,r,m2}$ | Mode 1 Mode 2 | ⎫ 108 |
| S=2 | $\overline{\mu s,r,m3}$ $\overline{\mu s,r,m4}$ | Mode 3 Mode 4 | |
| S=3 | $\overline{\mu s,r,m5}$ $\overline{\mu s,r,m6}$ | Mode 5 Mode 6 | |
| 0 0 0 | 0 0 0 | 0 0 0 | |

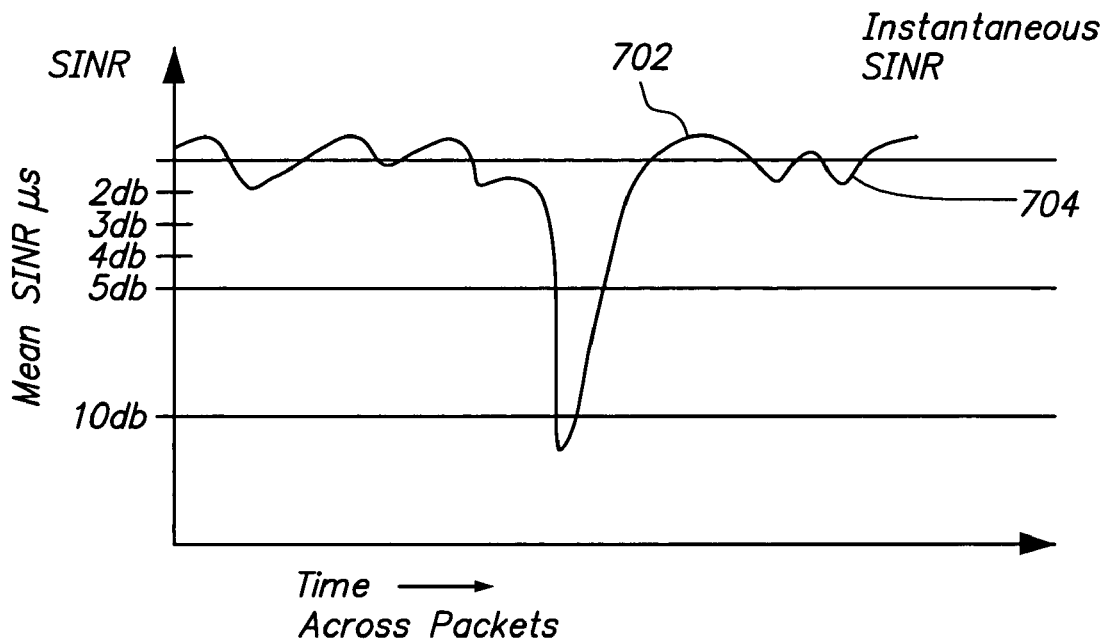

DATA RATE ADAPTATION IN MULTIPLE-IN-MULTIPLE-OUT SYSTEMS

CLAIM OF PRIORITY

The present application claims priority to co-assigned U.S. Provisional Application No. 60/447,448, entitled "Data Rate Adaptation in Multiple In Multiple Out (MIMO) Systems" and filed on Feb. 14, 2003.

BACKGROUND

Wireless phones, laptops, PDAs, base stations and other systems may wirelessly transmit and receive data. A single-in-single-out (SISO) system may have two transceivers in which one predominantly transmits and the other predominantly receives. The transceivers may use multiple data rates depending on channel quality.

An $M_R \times M_T$ multiple-in-multiple-out (MIMO) wireless system, such as that shown in FIG. 1, uses $M_T$ transmit antennas 104 at a first transceiver 100 and $M_R$ receive antennas 106 at a second transceiver 102. First and second transceivers 100, 102 in FIG. 1 are designated "transmitter" and "receiver", respectively, for the purposes of illustration, but both transceivers 100, 102 may transmit and receive data.

The multiple antennas 104, 106 may improve link quality (e.g., achieving a minimum bit error rate (BER)) by using a transmission signaling scheme called "transmit diversity," where the same data stream (i.e., same signal) is sent on multiple transmit antennas 104, after appropriate coding. The receiver 102 receives multiple copies of the coded signal and processes the copies to obtain an estimate of the received data.

The multiple antennas 104, 106 may achieve high data rates by using another transmission signaling scheme called "spatial multiplexing," where a data bit stream may be demultiplexed into parallel independent data streams. The independent data streams are sent on different transmit antennas 104 to obtain an increase in data rate according to the number of transmit antennas 104 used.

SUMMARY

The present application relates to a hybrid multiple-in-multiple-out (MIMO) system that may use aspects of link adaptation and cycling through a shortlist of transmit modes. A receiver may receive signals from a transmitter and derive channel quality statistics, such as a mean signal-to-interference-and-noise ratio (SINR). The receiver may compare the derived post-processing mean SINR with pre-determined threshold mean SINRs in a lookup table for an ideal "orthogonal" channel. The receiver may use the lookup table to efficiently find an optimum transmission mode or a shortlist of possible modes. The single lookup table may be relatively small and more efficient to implement than one or more lookup tables that account for multiple channel scenarios. The receiver feeds back the optimum transmission mode or shortlist to the transmitter, which adapts its spatial multiplexing rate s, coding rate r and modulation order m. The receiver may feed the optimum transmission scheme(s) back to the transmitter in a compressed manner, such as lookup table indices. The system may minimize retransmissions and hence improve medium access controller (MAC) throughput.

BRIEF DESCRIPTION OF THE DRAWINGS

FIG. 6A illustrates an example of the lookup table in FIG. 5.

FIG. 6B illustrates another example of the lookup table in FIG. 5.

FIG. 7 illustrates a graph of measured signal-to-interference-and-noise ratio (SINR) as it fluctuates over time.

FIG. 8 illustrates a table of time diversity orders and corresponding percentages of time that measured SINR fades 10 dB below the mean SINR in FIG. 7.

DETAILED DESCRIPTION

Figure 1:
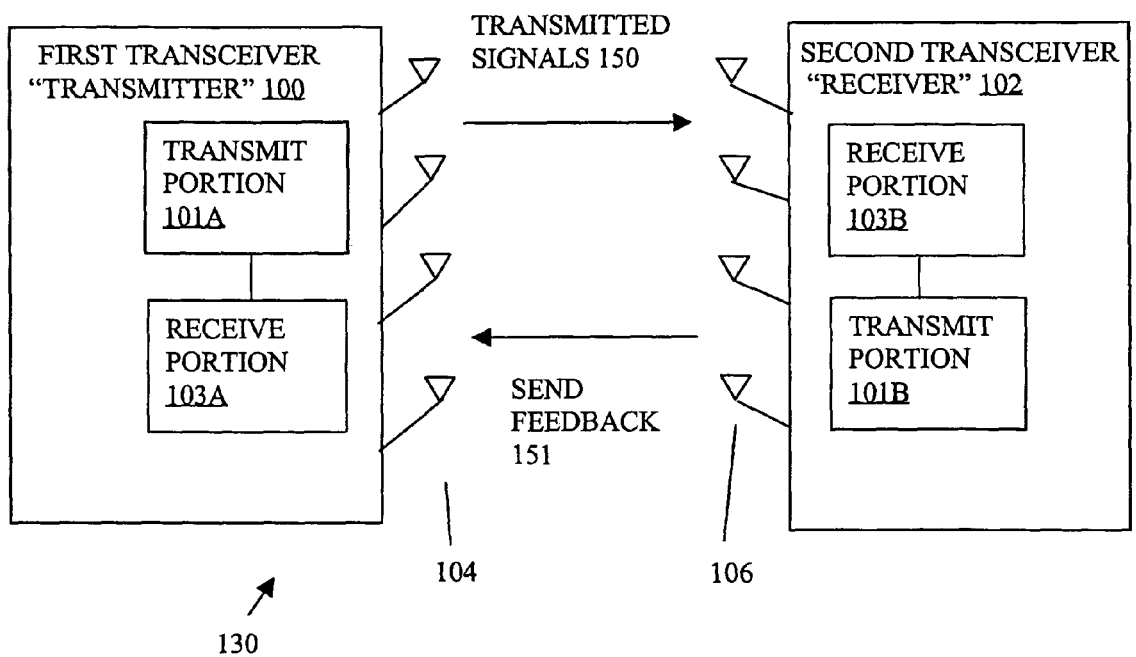
FIG. 1 illustrates a wireless multiple-in-multiple-out (MIMO) communication system, which includes transceivers with multiple antennas.

FIG. 1 illustrates a wireless multiple-in-multiple-out (MIMO) communication system 130, which includes a first transceiver 100 with multiple antennas 104 and a second transceiver 102 with multiple antennas 106. In an embodiment, each transceiver has four antennas, forming a 4×4 MIMO system. For the description below, the first transceiver 100 is designated as a "transmitter" because the transceiver 100 predominantly transmits signals to the transceiver 102, which predominantly receives signals and is designated as a "receiver". Despite the designations, both "transmitter" 100 and "receiver" 102 may transmit and receive data, as shown by the transmit portions 101A, 101B and receive portions 103A, 103B in each transceiver.

The transmitter 100 and receiver 102 may be part of a MIMO-OFDM (orthogonal frequency division multiplexing) system. OFDM splits a data stream into multiple radiofrequency channels, which are each sent over a subcarrier frequency. The transmitter 100 and receiver 102 are preferably implemented in LANs or WANs. It is also contemplated that such transceivers may be implemented in any type of wireless communication device or system, such as a mobile phone, laptop, personal digital assistant (PDA), a base station, a residence, an office, etc.

The number of independent data streams transmitted by the transmit antennas 104 may be called a "multiplexing order" or "spatial multiplexing rate" (s). A spatial multiplexing rate s=1 indicates pure diversity, and a spatial multiplexing rate $s=\min(M_R, M_T)$ (minimum number of receive or transmit antennas) indicates pure multiplexing. The MIMO system 130 may use combinations of diversity and spatial multiplexing, i.e., $1 \leq s \leq \min(M_R, M_T)$, depending on a channel scenario.

Each data stream may have an independent coding rate (r) and a modulation order (m). The physical (PHY) layer, or raw, data rate may be expressed as $R = r \times \log_2(m) \times s$ Bps/Hz. A transmitter's PHY layer chip may support many data rates depending on the values of s, r and m. For example, a 4×4 MIMO system with IEEE 802.11a coding and modulation schemes (8 in number) and 6 spatial multiplexing orders $$\left(s \in \left[\frac{1}{2}, \frac{3}{4}, 1, 2, 3, 4\right]\right)$$

may have up to 8×6=48 different data "transmission modes" or "transmission schemes," each with its own data rate.

A "transmission mode" or "transmit mode" refers to a set of transmission parameters, such as transmission signaling scheme (spatial multiplexing, transmit diversity or some combination), data rate R, coding rate r, modulation order m and modulation level, e.g., 8PSK (phase shift keying), GMSK (Gaussian minimum shift keying), BPSK (binary PSK), QPSK (quaternary PSK), 16-QAM (16-quadrature amplitude modulation, 64-QAM, etc.

The optimum data rate and transmission mode that achieve a target bit error rate (BER) may vary, depending on user locations and channel characteristics, which may cause time-selective fading, frequency-selective fading and space-selective fading.

The current IEEE 802.11 modem of a single-in-single-out (SISO) transmitter starts transmission at the highest possible data rate. If the transmitter modem receives an acknowledgement (ACK) signal from a SISO receiver, then the modem uses the highest possible data rate for further transmissions. Otherwise, the modem lowers the data rate and cycles through all possible data rates until the transmitter receives an ACK signal from the receiver. For a 4×4 MIMO system with 48 possible data rates, the cycle-through method may waste a significant amount of real-time bandwidth.

"Link adaptation" (also referred to as "adaptive modulation") may be a more efficient mechanism to select an optimum data transmission rate. Link adaptation has been studied for SISO systems. A receiver (a) measures a channel quality characteristic (also called channel quality condition or channel state information (CSI)) (e.g., signal-to-noise ratio (SNR) or signal-to-interference-and-noise ratio (SINR)), (b) converts the channel characteristic into BER information for each transmit mode, (c) selects an optimum transmit mode (from a plurality of modes) based on the channel characteristic and a target BER, and (d) feeds the channel characteristic or selected mode back to the transmitter. The transmitter receives the fed back channel characteristics or selected mode and adjusts its transmit mode and data rate accordingly.

Link adaptation exploits variations of a wireless channel over time, frequency and/or space due to changing environmental and interference conditions by dynamically adjusting transmission parameters. Link adaptation may select the most efficient mode for spectral efficiency over varying channel conditions based on a mode selection criterion, e.g., maximum data rate, for each link. Since each transmit mode has a unique data rate and minimum SNR needed to activate the mode, different transmit modes are suited for optimal use in different channel quality regions.

For example, the receiver may estimate a SINR for each channel realization and choose a transmit mode (data rate, transmission coding rate r, and modulation order m). In an ideal link adaptation system, the receiver receives a packet and instantaneously sends feedback indicating the chosen transmit mode to the transmitter. Fast feedback is not always possible or desired because feedback consumes bandwidth. For systems with a limited feedback rate (e.g., slower than the "channel coherence time", which is the time duration when channel impulse responses remain strongly correlated), the receiver may receive a plurality of packets during a time window and obtain SINR "statistics" (e.g., mean SINR, variance, etc.) from the packets. The transmitter may use the SINR "statistics" to adapt the transmit mode.

A SISO receiver may create a plurality of lookup tables for a plurality of channel scenarios. Each channel scenario may be characterized by SINR variance across time ($\sigma_t^2$) and variance across frequency ($\sigma_f^2$). The receiver may index the lookup tables according to $\sigma_t^2$ and $\sigma_f^2$. Each lookup table has a plurality of entries for a plurality of different transmit modes and their mean threshold SINRs ($\bar{\mu}_{r,m}$). The mean threshold SINR is the minimum SINR required for a given transmit mode to operate at a target BER.

For each time window, which can span several received packets, the receiver computes the mean SINR ($\mu$) and SINR variances $\sigma_t^2$, $\sigma_f^2$. The receiver uses the SINR variances to select an appropriate lookup table. Within the selected lookup table, the receiver uses the mean SINR ($\mu$) to select a transmit mode (data rate, transmission coding rate r, and modulation order m) that maximizes the data rate while operating at the target BER or packet error rate (PER). In other words, $$r^*, m^* = \arg\max_{r,m}[\text{sgn}(\mu - \bar{\mu}_{r,m}) \times s \times \log_2 m \times r]$$

where $s \times \log_2 m \times r$ is the data rate as described above. The BER may be extracted from the cyclic redundancy check (CRC) information at the link layer. If multiple transmit modes yield the same data rate, then the receiver or transmitter may select the transmit mode with the highest SINR margin ($\mu - \bar{\mu}_{r,m}$).

A similar link adaptation scheme may be implemented in a MIMO system. However, such an approach may be difficult to implement since MIMO channel scenarios and transmit modes are much larger than in a SISO system. The channel scenarios may be larger due to dependencies on properties like LOS (line-of-sight) matrix, polarization, correlation, etc. For example, assuming 10 different channel scenarios and 48 transmit modes for a 4×4 IEEE 802.11 MIMO system, the MIMO system may require in a large lookup table with 48×10=480 entries (or 10 lookup tables each with 48 entries). If any transmission scheme is changed or added, all 480 entries may have to be recomputed. Computing the lookup table entries via numerical simulation or measurements for each channel scenario may be difficult and time-consuming.

Link Adaptation and Cycling Through a Shortlist

In an embodiment, the MIMO system 130 in FIG. 1 may use a hybrid scheme that combines aspects of link adaptation and cycling through a subset of available transmit modes, e.g., a shortlist of best transmit modes determined at the receiver 102. The hybrid scheme may address the MIMO link adaptation problems described above.

Figure 2:
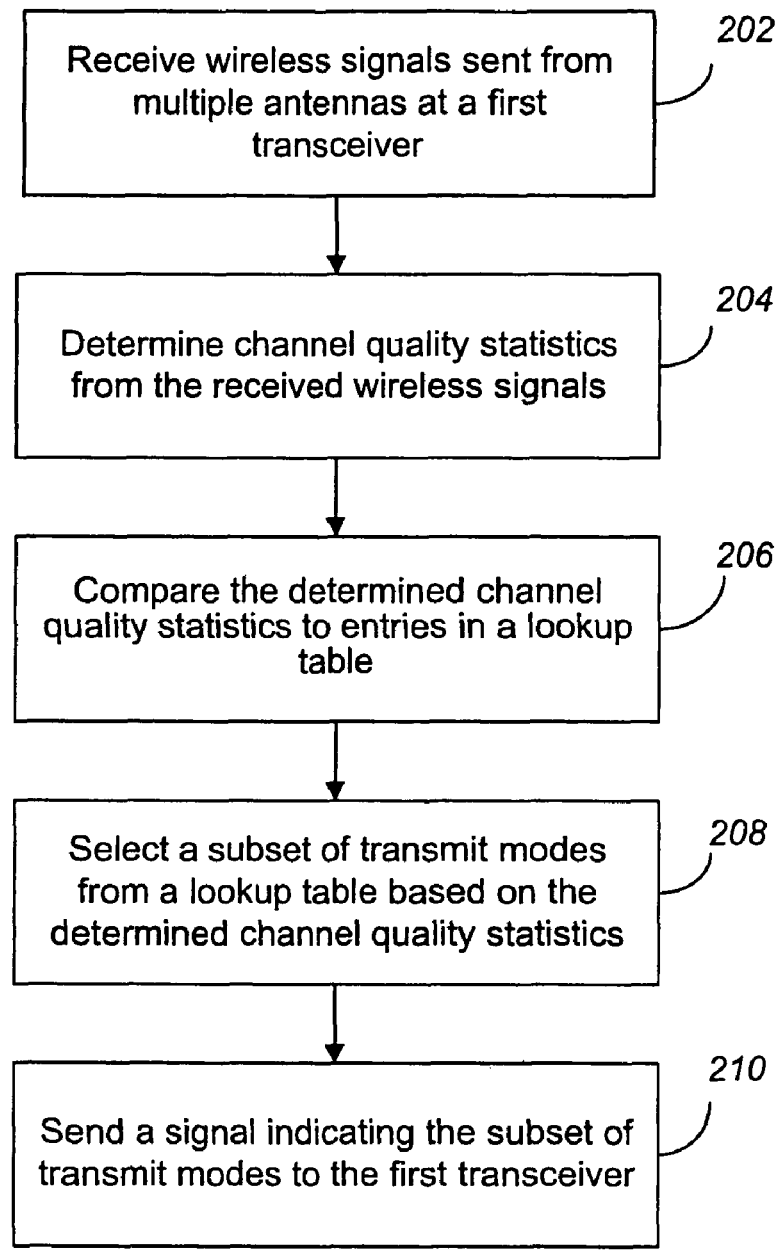
FIG. 2 is a flowchart of a method of using the system of FIG. 1.
Figure 3:
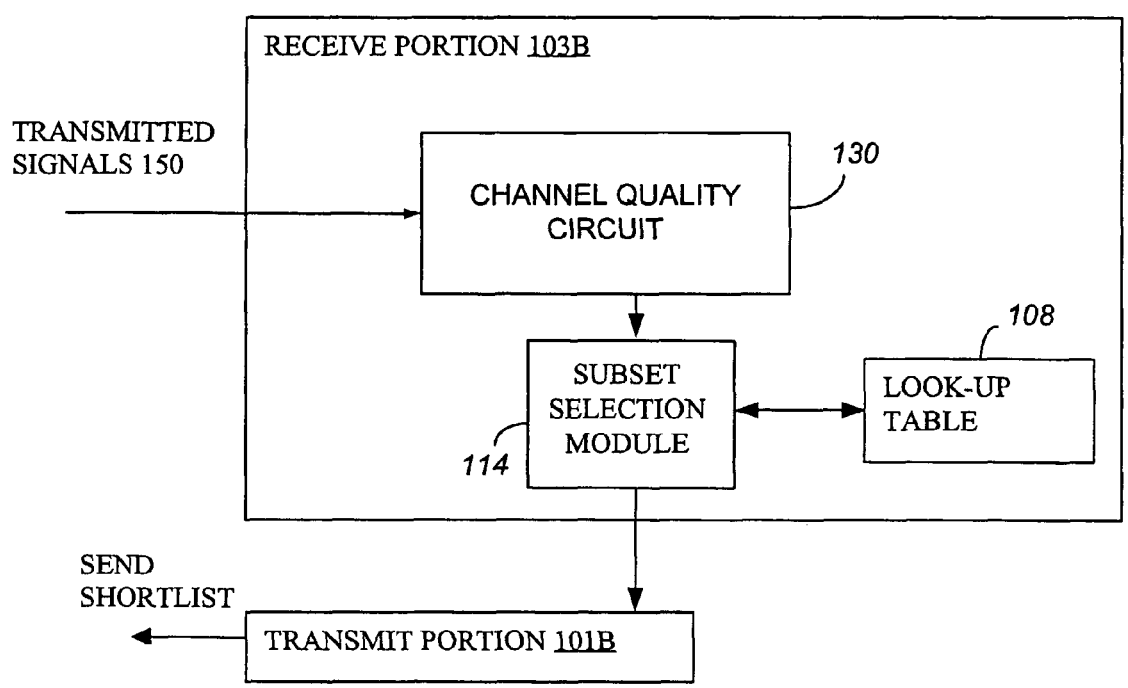
FIG. 3 illustrates an embodiment of the receive portion and transmit portion of the receiver in FIG. 1.

FIG. 2 is a flowchart of an exemplary method of link adaptation and cycling through a shortlist, which may be used by the system 130. The transmit portion 101A (FIG. 1) of the transmitter 100 sends signals/packets 150 which are received by the receive portion 103B of the receiver 102 at 202 (FIG. 2). FIG. 3 illustrates an embodiment of the receive portion 103B and transmit portion 101B of the receiver 102. A channel quality circuit 130 in the receive portion 103B of the receiver 102 may determine one or more channel quality statistics from the received signals 150 at 204. A subset selection module 114 in the receive portion 103B compares the channel quality statistics to entries in a lookup table 108 at 206. For example, each entry in the lookup table 108 may store a transmit mode and its corresponding channel quality statistic, e.g., a threshold post-processing mean SINR $\overline{\mu_{s,r,m}}$ (described below). The subset selection module 114 selects a shortlist or subset of transmit modes from the lookup table 108 with channel quality statistics that are close to the measured channel quality statistics at 208. The transmit portion 101B of the receiver 102 sends the shortlist to the receive portion 103A of the transmitter 100 at 210. The shortlist feedback may be a part of an acknowledge/no acknowledge (ACK/NACK) packet.

Figure 4:
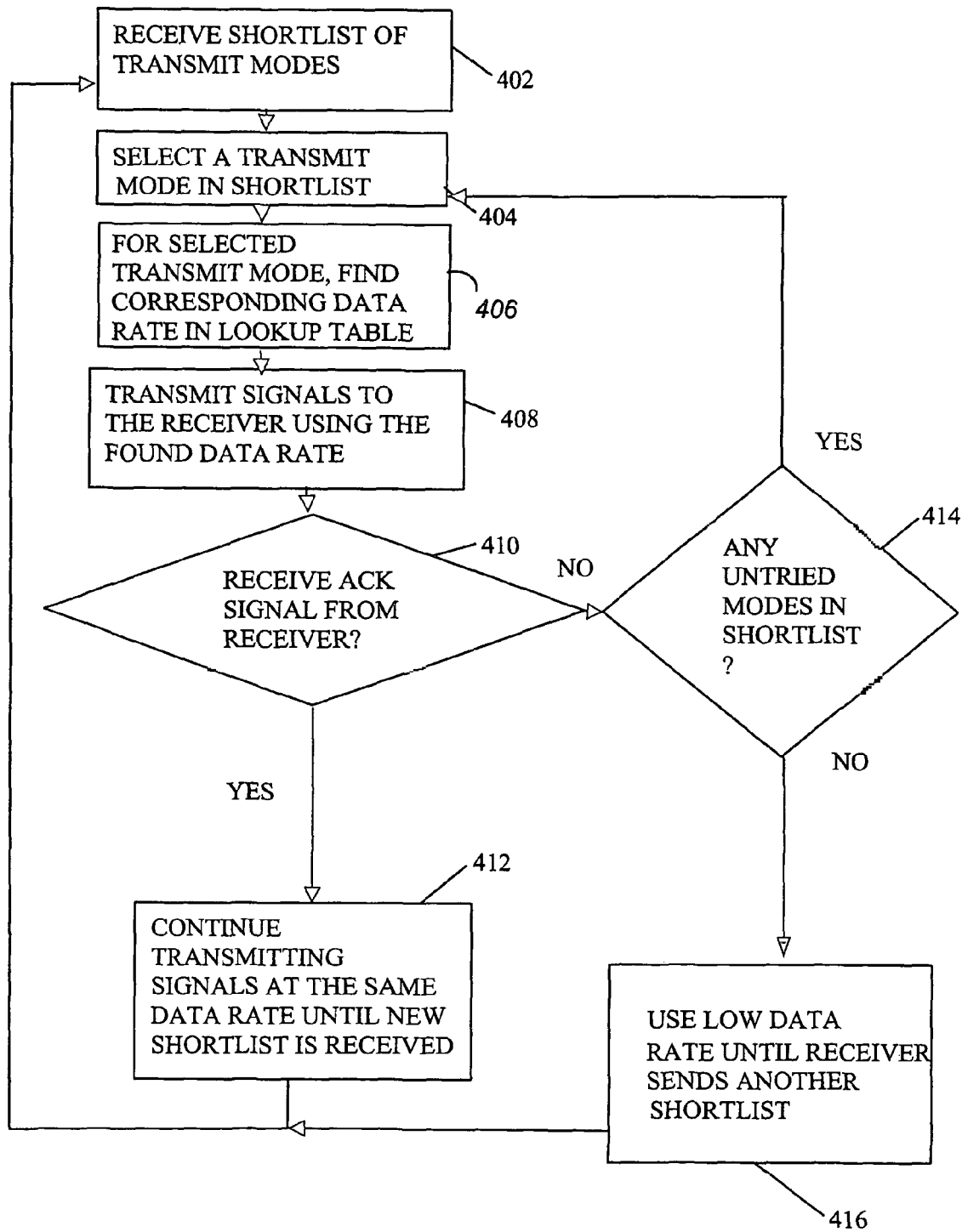
FIG. 4 illustrates operations of the transmitter in FIG. 1.

FIG. 4 illustrates operations of the transmitter 100 in FIG. 1. The receive portion 103A of the transmitter 100 receives the shortlist of modes at 402. The transmitter 100 selects a transmit mode in the shortlist at 404 and finds a corresponding data rate in a lookup table stored in the transmitter 100 at 406. The transmit portion 101A of the transmitter 100 initiates further transmission at the found data rate (e.g., highest data rate selected from the shortlist of modes) at 408. If the transmitter 100 receives an ACK from the receiver 102 within a pre-determined time period at 410, then further transmissions from the transmitter 100 may occur at this data rate at 412. Otherwise, the transmitter 100 lowers the data rate and cycles through the shortlist of modes at 414 until an ACK is received from the receiver 102 at 410.

If the transmitter 100 has tried every mode and its corresponding date rate in the shortlist 108, an alternative strategy may be used. For example, the transmitter may use a low data rate until the receiver 102 sends another shortlist at 416. In alternative embodiments, the transmitter may try other data rates or request a new shortlist from the receiver 100.

Figure 5:
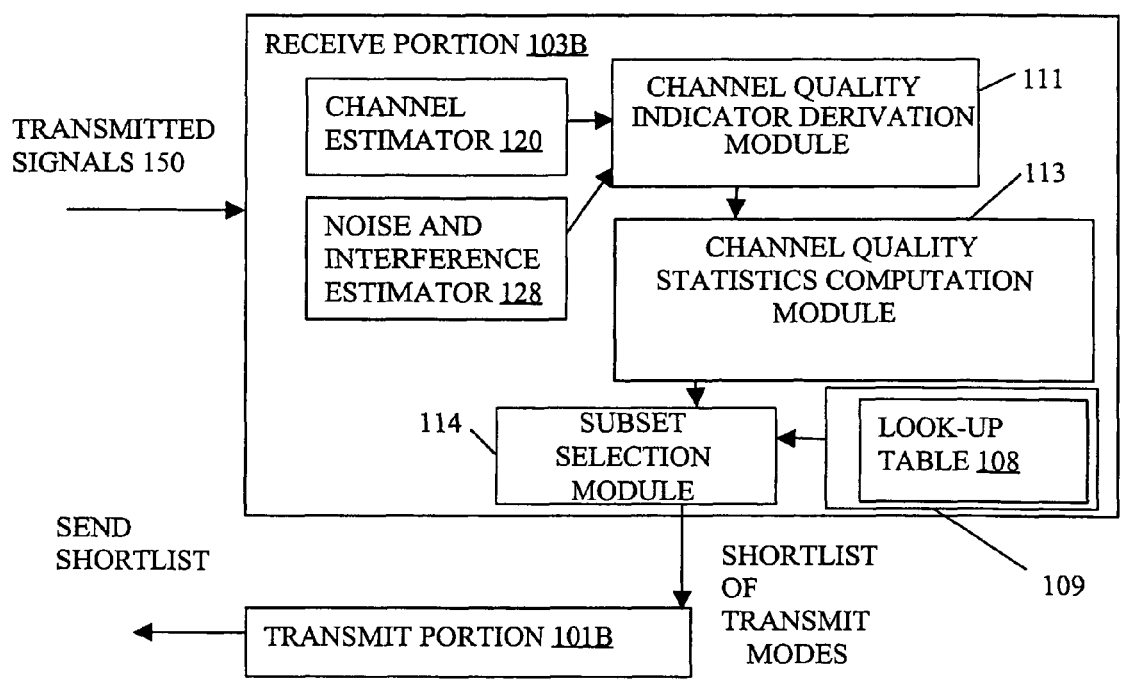
FIG. 5 illustrates another embodiment of the receive portion and transmit portion of the receiver in FIG. 1.

In an embodiment, the receiver 102 may store pre-configured operating modes in a memory such as a non-volatile memory 109, which may include the lookup table 108, as shown in FIG. 5. The lookup table 108 may have entries for a plurality of transmission modes (e.g., 48 modes) and corresponding mean threshold receive "post-processing" SINRs ($\overline{\mu_{s,r,m}}$). A "post-processing" SINR refers to SINR derived after data from multiple antennas are combined, as opposed to a "pre-processing" SINR derived from data at each antenna. A mean threshold receive post-processing SINR ($\overline{\mu_{s,r,m}}$) is the minimum post-processing mean SINR required for a given transmit mode (i.e., set of spatial multiplexing rate s, coding rate r, and modulation order m values) to operate at a target BER.

FIG. 6A illustrates an example of the lookup table 108 in FIG. 5. FIG. 6B illustrates another example of the lookup table 108 in FIG. 5, in which the available modes are separated by different spatial multiplexing rates, e.g., s=1, 2, etc. (described below).

In contrast to the proposed MIMO link adaptation scheme with multiple channel scenarios described above (which used 10×48=480 entries), the receiver 102 may store a relatively small lookup table 108 (e.g., 48 entries) by assuming a selected ideal or generalized reference channel, such as an "orthogonal channel" or an Independent and Identically Distributed (IID) channel. An IID channel may use a random MIMO matrix, where each element of the MIMO matrix is a complex, normal and distributed mean of zero and a variance of one. An IID channel accounts for fading margins. An "orthogonal" channel does not account for fading margins and may be equivalent to an additive white Gaussian noise (AWGN) channel for a SISO system. An orthogonal channel may be relatively easy to simulate. The receiver 102 may simulate both an IID channel and an orthogonal channel to see which one provides better results. The lookup table 108 based on a selected ideal or generalized reference channel may be relatively easy to generate and save. Thus, the receiver 102 does not have to save lookup tables for a plurality of channel scenarios.

For example, in a 4×4 MIMO system, the lookup table 108 based on an orthogonal channel may have 48 entries for 48 modes and their threshold post-processing mean SINRs ($\overline{\mu_{s,r,m}}$), as opposed to 480 entries for the MIMO link adaptation scheme described above.

The receiver 102 may receive a plurality of packets 150 from the transmitter 100 during a time window, which may span several packets. The packets 150 may undergo processing, such as demodulation, and reach a channel estimator 120 and a noise and interference estimator 128. For each time window, the channel estimator 120 estimates a channel response, and the noise and interference estimator 128 estimates noise and interference. Various techniques may be used for channel estimation and noise and interference estimation. For example, in an embodiment, each transmit antenna transmits a known training sequence that is orthogonal to the training sequences transmitted by the other transmitters. The channel estimator 120 uses the received training sequence and known transmit sequence to estimate the channel element for each transmit-receive antenna pair. For noise and interference estimation, the transmitter transmits null-sequences (e.g., zero tones or empty packets). During this period, the receiver records signals for each receive antenna. These signals are attributed to receiver noise and interference. The noise variance ($\sigma^2$) is the variance of the noise (and interference) signal.

A channel quality indicator derivation module 111 derives a channel quality indicator, such as post-processing SINR, based on outputs of the channel estimator 120 and noise and interference estimator 128. The post-processing SINR may be referred to as instantaneous or derived at a particular instant in time.

For each time window, a channel quality statistics computation module 113 computes channel quality statistics, such as a post-processing mean SINR $\mu_s$ and a "margin SINR". The margin SINR is an increase in mean SINR desired to guard against channel fades. The margin SINR may include a "fading margin" and a "frequency diversity gain," as described below. If the channel has no fades, then margin SINR=0. If the channel has severe fading, then margin SINR may be a relatively large number. The statistics computation module 113 at the receiver 102 may generate the mean receive post-processing SINR $\mu_s$ and margin SINR for each spatial multiplexing rate s using the MIMO channel estimate from the channel estimator 122 and noise and interference power estimate from the noise and interference power estimator 128 at the receiver 102.

The statistics computation module 113 may then compute an "outage SINR," which is mean SINR+margin SINR. The subset selection module 114 uses the post-processing mean SINR or preferably the outage SINR to find entries in the lookup table 108 that have a threshold post processing mean SINR close to the currently estimated mean SINR or outage SINR. The subset selection module 114 may select a particular number of entries (e.g., one to five), and send a shortlist of modes from the selected entries back to the transmitter 100 via the transmit portion 101B.

The transmitter 100 may try sending data using the mode from the shortlist with the highest data rate at 406 in FIG. 4, and check for an acknowledgement (ACK) signal from the receiver 102 at 410. If the transmitter 100 does not receive an ACK signal or receives a no-acknowledgement (NACK) signal, the transmitter 100 tries the next highest data rate of another mode in the shortlist at 414, 404. The transmitter 100 may eventually cycle through all data rates in all modes of the shortlist at 416.

There are at least two advantages of this system. The shortlist sent as feedback from the receiver 102 to the transmitter 100 saves channel bandwidth because only a limited number of modes are sent instead of 48 modes or other channel information that may require a number of feedback messages. In addition, the transmitter 100 saves time and resources by cycling through a limited number transmit modes and does not have to cycle through 48 transmit modes.

In an embodiment, the subset selection module 114 generates a shortlist with three transmit modes. If the transmitter 100 tries all three transmit modes and does not receive an ACK signal (e.g., because the receiver 102 did not estimate a mean SINR or margin SINR accurately or the channel conditions suddenly change), the receiver 102 may repeat the process of estimating a mean SINR and Margin SINR, finding three closest entries in the lookup table 108, and sending another shortlist to the transmitter 100 at 210 in FIG. 2. The transmitter 100 may switch to a low data rate at 416 in FIG. 4 until the receiver 102 sends another shortlist. Alternatively, the transmitter may try other data rates or request a new shortlist from the receiver 100, as described above.

The receiver 102 may be modified to provide instantaneous feedback to the transmitter 100 without estimating the margin and mean SINR. The tradeoff is between feedback rate and performance. Feedback based on SINR statistics (mean SINR and/or Margin SINR) may transmit at a lower data rate to guard against fluctuations in channel quality (as long as the fluctuations were present in the time window of packets used to estimate SINR statistics). Instantaneous feedback of an optimum data rate may use up more "feedback" bandwidth but may transmit at the optimum rate depending on the exact channel state.

The lookup table 108 may have a plurality of entries with threshold post-processing mean SINRs ($\overline{\mu_{s,r,m}}$), which are the minimum SINRs required for available transmit modes. Each transmit mode may include a spatial multiplexing rate s (e.g., 1, 2, 3, 4), a coding rate r (e.g., the same as used by IEEE 802.11), and a modulation order m (e.g., 4QAM, 16 QAM, 64QAM, etc.). The description below describes how the receiver 102 derives a post-processing mean SINR measurement, a fading margin or Margin SINR, a frequency diversity gain $\alpha_r$, and from these quantities, the outage SINR and "total Outage SINR." The subset selection module 114 may then compare the outage SINR or total outage SINR with the lookup table entries to determine the shortlist of modes with their transmission rates.

Time-Selective Fading

FIG. 7 illustrates a graph of measured instantaneous SINR 702 as it fluctuates over time. The instantaneous post-processing SINRs will fade in time across packets. The mean SINR $\mu_s$ 704 indicates the average SINR across time. A fading margin $f_s$ indicates how much the SINR will fade below the mean SINR $\mu_s$ for a given x % of a time window. If there is no fading, then $f_s=0$. If the channel is fast-fading, then $f_s$ may be a relatively large number, e.g., 10 dB. There may be a number of ways for the statistics computation module 113 to compute a fading margin $f_s$ to account for fading. A specific method of measuring this fading margin $f_s$ is described below. The statistics computation module 113 or receiver software may compute the fading margin.

The statistics computation module 113 computes a probability expressed as $P(SINR<\mu_s-\gamma)=x$ %+/−$\epsilon$ % for each instantaneously measured post-processing SINR, a derived mean SINR $\mu_s$ (see FIG. 7) for multiple packets received in a time window, a target x %, e.g., 10%, a desired $\epsilon$ % indicating tolerance for measurement error, e.g., 1% or 2%, and different values of a variable $\gamma=[0 \ldots fs \ldots MAX\_VALUE]$ dB to find an appropriate fading margin $f_s$. For example, the statistics computation module 113 may try 3 dB, 6 dB, 9 dB, and 12 dB for $\gamma$ in the equation above. As another example, the module 113 may try 2 dB, 4 dB, 6 dB, and 8 dB for $\gamma$ in the equation above. The statistics computation module 113 may use a histograph. Whichever value of $\gamma$ that provides a probability P closest x %+/−$\epsilon$ % is selected as the fading margin fs. If the probability is $\approx$x % for a certain value of $\gamma$, then that $\gamma$ is selected as the fading margin $f_s$. For example, in one application, MAX_VALUE can be 20 dB, x=10%, $\epsilon$=2%.

There may be different fading margins $f_s$ for different multiplexing rates s. Each multiplexing rate s can exhibit an independent diversity order $d_s$, which may represent how much the post processing SINR will fade in time due to channel fades. For a 4×4 MIMO system 130 with four spatial multiplexing rates s=1, 2, 3, 4, the statistics computation module 113 may determine four corresponding fading margins $f_s$, one fading margin $f_s$ for each multiplexing rate s.

FIG. 8 illustrates a table of time-diversity orders $d_s$ and corresponding percentages of time (x %) that measured SINR fades $\gamma=10$ dB (a selected and fixed value) below the mean SINR $\mu_s$ 704 in FIG. 7. The second column in FIG. 8 represents the "x" % variable described above. For example, a "first-order" time-diversity describes a post processing SINR that fades in time by $\gamma=10$ dB below the mean SINR $\mu_s$ x=10% of the time.

The "Outage SINR" may be expressed as:

$$G_s=\mu_s+fs$$

$G_s$ represents a desired goal of estimated outage SINR and may be used by the subset selection module 114 to find one or more entries in the lookup table 108. $G_s$ is equal to the receive post-processing mean SINR $\mu_s$ plus the fading margin $f_s$. The fading margin $f_s$ represents how much the mean SINR $\mu_s$ will probably fade or fluctuate over time, and $G_s$ is intended to account for this fading. If the fading margin $f_s$ is large, then $G_s$ will be large.

Another method of obtaining the fading margin $f_s$ uses a known expression $$\left(f_s = \frac{10}{d_s} \times \log_{10}(x/100)\right)$$

relating outage probability and diversity order $d_s$ at high SINRs. The value "x" is a reliability factor (the second column in FIG. 8) obtained according to an expression $$P_b = \leq 0.5 \times \frac{x}{100},$$

where $P_b$ is the target BER of the receiver 102. This equation assumes that for (100−x) % of the time, $G_s$ (x % outage SINR) will be greater than a threshold post-processing mean SINR $\overline{\mu_{s,r,m}}$ and have zero BER. While x % of the time, the received mean post-processing SINR $\mu_s$ 110 will be smaller than the threshold post-processing mean SINR $\overline{\mu_{s,r,m}}$ and have 50% BER. For $P_b=5\times10^{-3}$, the above expression yields x=1%, providing 99% reliability.

The diversity order $d_s$ may be computed by a number of methods. One method for deriving diversity order $d_s$ assumes a Rayleigh fading channel. "Rayleigh fading" refers to a transmitted signal that spreads out, scatters and takes multiple paths of different lengths to arrive at a receiver antenna at different times. The ensemble of signals reflected by the ground, bodies of water, atmosphere, etc., arrive at the receiver antenna and create standing waves. Multipath fading occurs. The method can approximate the receiver post-processing instantaneous SINR to be a chi-square random variable with $2d_s$ degrees of freedom. It is known that for Rayleigh fading channels, an $M_R \times M_T$ system with spatial multiplexing rate $s \geq 1$ has a diversity order of $d_s=(M_R-s+1)\times(M_T-s+1)$. Theoretically, the receive post-processing instantaneous SINR is then a chi-square random variable with $d_s=2\times(M_R-s+1)\times(M_T-s+1)$ degrees of freedom. However, in practice, channel properties such as correlation, etc, can lead to a smaller diversity order, i.e., $d_s<2\times(M_R-s+1)\times(M_T-s+1)$. Assuming that the instantaneous SINR can still be approximately modeled as a chi-square random variable with $2d_s$ degrees of freedom. The statistics computation module 113 may compute $$d_s = \sqrt{\frac{\mu_s}{\sigma_s}},$$

where $\sigma_s^2$ is a variance of receive post-processing instantaneous SINR in time.

Frequency-Selective Fading

The receive post-processing instantaneous SINR may experience frequency-selective fading caused by a multipath channel. In such a case, the outer forward error correction (FEC) codes in packets transmitted from the transmitter 100 may extract a "frequency diversity gain $\alpha_r$," depending on the coding rate r. Frequency diversity gain $\alpha_r$ may be understood as follows. In a multipath or frequency-selective fading channel, some tones of the OFDM system can be in a fade, while others may not. The FEC can recover or correct for the bits transmitted on the tones in a fade and improve the system performance. This improvement is called frequency diversity gain $\alpha_r$. This gain is measured by a decrease in Outage SINR required to obtain a target system BER. Typically, the lower the target BER, the higher the frequency diversity gain $\alpha_r$. The frequency diversity gains $\alpha_r$ provided by different FECs on a multipath channel at a certain BER, are well-understood. With more frequency-selectivity, there will be more frequency diversity gain $\alpha_r$. For a flat-fading channel, the frequency diversity gain $\alpha_r$ is 0.

The frequency diversity gain $\alpha_r$ can be computed by the statistics computation module 113 via numerical simulations and stored in a lookup table separate from the lookup table 108 in FIG. 5. For example, a frequency diversity gain lookup table may comprise coding rates of ½, ⅔ and ¾ and corresponding frequency diversity gains of 3 dB, 2 dB and 1 dB, respectively.

Using the Lookup Table

As stated above, the outage SINR may be expressed as $G_s=\mu_s+f_s$, where $\mu_s$ is the derived post-processing mean SINR and $f_s$ is the derived fading margin. The statistics computation module 113 may combine (a) the outage SINR $G_s$ (for each spatial multiplexing rate s, e.g., s=1, 2, etc.) over time, with (b) the frequency diversity gain $\alpha_r$ (for each coding rate r) to obtain a "total Outage SINR" expressed as $G_{s,r}=G_s+\alpha_r$. The table look-up module 114 may use the total Outage SINR $G_{s,r}$ to find one or more entries in the lookup table 108 with comparable post-processing mean threshold SINRs $\overline{\mu_{s,r,m}}$ to obtain one or more acceptable or optimum transmission modes. This may be expressed as finding an acceptable or optimum coding rate r and modulation order m for a given spatial multiplexing rate s:

$$s^*, r^*, m^* = \arg\max_{s,r,m}[\text{sgn}(G_{s,r} - \overline{\mu_{s,r,m}}) \times s \times \log_2 m \times r],$$

where "max" means maximum value, "sgn" means signum, and $R=r\times\log_2(m)\times s$ is the physical layer (raw) data rate ($R_{s,r,m}$) in Bps/Hz. If $\text{sgn}(G_{s,r}-\overline{\mu_{s,r,m}})=+1$, i.e., $G_{s,r}>\overline{\mu_{s,r,m}}$, then s, r, m represent an acceptable mode for a shortlist. If $\text{sgn}(G_{s,r}-\overline{\mu_{s,r,m}})=-1$, i.e., $G_{s,r}<\overline{\mu_{s,r,m}}$, then s, r, m represent an unacceptable mode for a shortlist.

If multiple transmission modes yield the same data rate, then the subset selection module 114 may choose the mode leading to the highest margin $G_{s,r}-\overline{\mu_{s,r,m}}$.

Values Depend on Spatial Multiplexing Rate

In the channel quality statistics computation module 113 in FIG. 5, different spatial multiplexing rates s=1, 2, etc. may be associated with different receiver types. If one stream of data is received (s=1), one type of receiver may be used. If two streams of data are received (s=2), two different types of receivers may be used. For a 4×4 MIMO system, there may be 4 or 6 spatial multiplexing rates (e.g., s=½, ¾, 1, 2, 3, 4). The statistics computation module 113 may be configured to determine a unique set of post-processing mean SINR $\mu_s$, margin SINR (including fading margin $f_s$ and frequency diversity gain $\alpha_r$), and a total outage SINR $G_{s,r}$ depending on which spatial multiplexing rate s is used by the transmitter 100.

For example, if the transmitter 100 uses spatial multiplexing rate s=1, then the statistics computation module 113 may determine a first post-processing mean SINR $\mu_s$, a first margin SINR (including a first fading margin $f_s$ and a first frequency diversity gain $\alpha_r$), and a first total outage SINR $G_{s,r}$. If the transmitter 100 uses another spatial multiplexing rate s=2, then the statistics computation module 113 may determine a second post-processing mean SINR $\mu_s$, a second margin SINR (including a second fading margin $f_s$ and a second frequency diversity gain $\alpha_r$), and a second total outage SINR $G_{s,r}$. The subset selection module 114 then uses the first or second (s=1 or 2) total outage SINR $G_{s,r}$ to access the lookup table 108, which may also have threshold mean SINRs and transmit modes categorized by s=1, s=2, etc., as shown in FIG. 6B.

The subset selection module 114 may use the computed outage SINR or total outage SINR to select a few transmission modes from the look-up table 108, in decreasing order of data rate, to be in a shortlist and sent back to the transmitter 100.

The transmit portion 101B of the receiver 102 may send the transmitter 100 a signal indicating the transmit modes in the shortlist, which may adapt the data transmission rate, coding rate r and modulation order m of new data packets accordingly (FIG. 5). The transmit portion 101A of the transmitter 100 may indicate a new transmit mode in a preamble or header of a packet to send to the receiver 102, which notifies the receiver 102 that the transmitter 100 will use the new transmit mode. The receiver 102 may then switch to the new transmit mode.

The signal may identify the transmit modes in the shortlist explicitly, or may include indices to a table or addresses in a memory in which the transmit modes are stored. For example, The transmit portion 101B of the receiver 102 may send transmit mode indices (s*, r*, m*) to the transmitter 100. The indices indicate entries in a lookup table 108, which is also stored in the transmit or receive portions 101A, 103A of the transmitter 100 or elsewhere in the transmitter 100. The transmit portion 101A of the transmitter 100 puts the indices (s*, r*, m*) in a preamble or header of a packet to send to the receiver 102, which notifies the receiver 102 that the transmitter 100 will use new s*, r*, and m*. The receiver 102 switches to the new s*, r*, and m*.

The methods above may be a high data rate extension of IEEE 802.11a. These methods may be an efficient mechanism to select a large number of data rates. For example, if there are 4 transmit antennas, each with 50 Mbits/s, the transmitter may select from a large number of different data rates from 6 Mbits/s to 200 Mbits/s.

Figure 9:
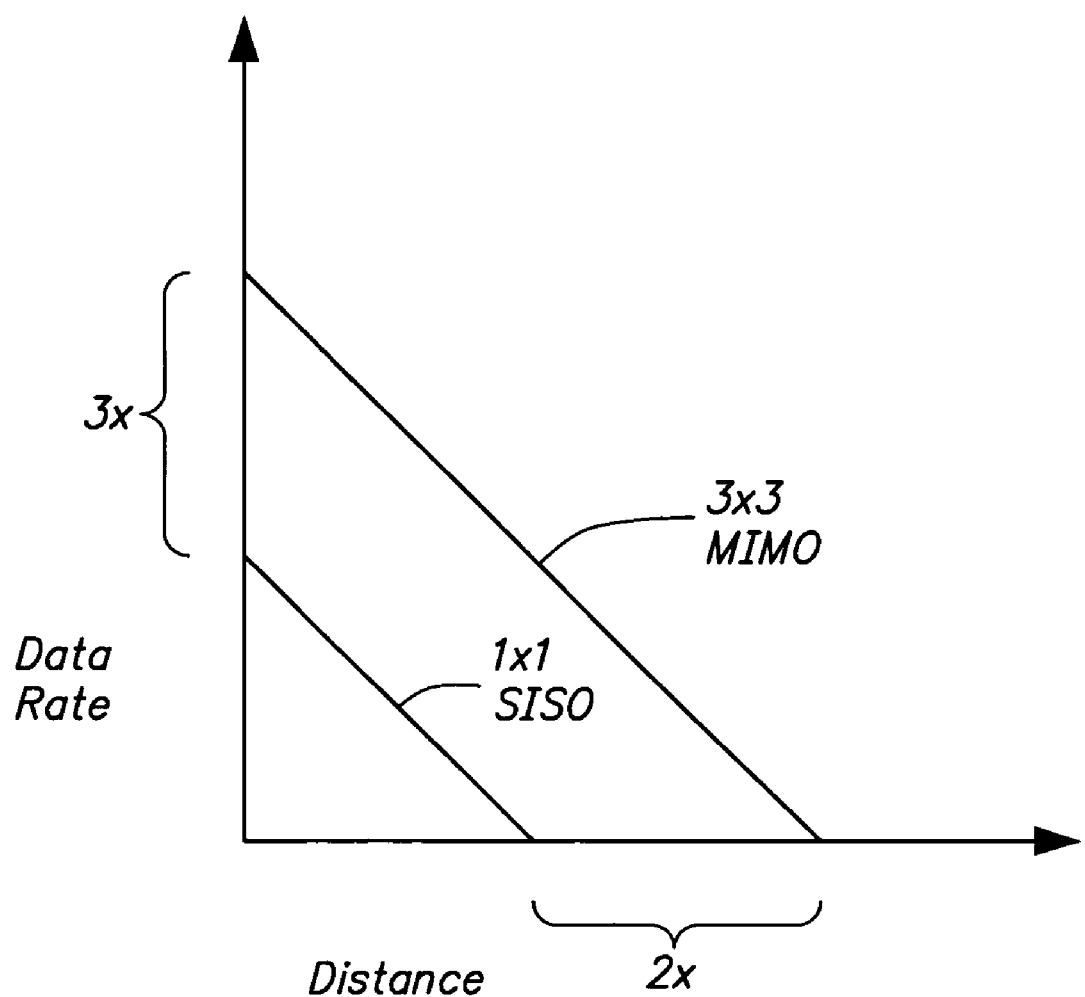
FIG. 9 is a rate vs. distance graph of a 1×1 single-in-single-out (SISO) system and a 3×3 MIMO system.

FIG. 9 is a rate vs. distance graph of a 1×1 SISO system and a 3×3 MIMO system. Compared to the SISO system, the MIMO system provides a higher data rate at a given distance, a farther distance for communication at a given data rate, and more system and network capacity. Furthermore, more users can use the MIMO system.

In alternative embodiments, the receiver 102 may transmit prohibited transmit modes, i.e., transmit modes other than those determined to be optimal. The prohibited modes may include all modes other than those determined to be optimal based on the channel quality statistics, or may include transmit modes determined to be the worst transmit modes based on the channel quality statistics. The prohibited transmit modes may be transmitted as, e.g., transmit modes, indices to a table, or memory addresses. After receiving the prohibited transmit modes, the transmitter 100 may transmit signals using transmit modes other than the prohibited modes, e.g., by cycling through available modes in the lookup table 108.

In alternative embodiments, the techniques described above may be implemented on other types of communication systems, such as, for example, SISO, SIMO (single-in multiple-out), and MIMO (multiple-in multiple-out) systems.

A number of embodiments have been described. Nevertheless, it will be understood that various modifications may be made without departing from the spirit and scope of the application. For example, a 3×3 MIMO system may be used. Accordingly, other embodiments are within the scope of the following claims.

The invention claimed is:

1. A system comprising:
a first transceiver operative to transmit signals in accordance with a first transmit mode over a channel; and
a second transceiver operative to receive the signals, the second transceiver including:
a channel quality module operative to determine a channel quality statistic from the signals,
a selection module operative to select N transmit modes from M transmit modes based on the determined channel quality statistic, where M>N and where N>1; and
a transmit module operative to transmit a signal indicating the N transmit modes to the first transceiver;
wherein the first transceiver is operative to transmit signals in accordance with a first one of the N transmit modes in response to receiving the signal indicating the N transmit modes from the second transceiver, and transmit signals in accordance with a second one of the N transmit modes in response to an indication that the signal transmitted in the first one of the N transmit modes was not received at the second transceiver, the first one of the N transmit modes being associated with a data rate higher than a data rate associated with the second one of the N transmit modes.

2. The system of claim 1, wherein the signal indicating the N transmit modes comprises the N transmit modes.

3. The system of claim 1, wherein the signal indicating the N transmit modes comprises indices to a table.

4. The system of claim 1, wherein the signal indicating the N transmit modes comprises one or more memory addresses.

5. The system of claim 1, wherein the first transceiver is operative to continue to transmit signals in accordance with the first one of the N transmit modes in response to an indication that the signal transmitted in said first one of the N transmit modes was received at the second transceiver.

6. The system of claim 5, wherein said indication comprises an acknowledgement (ACK) signal sent by the second transmitter.

7. The system of claim 1, wherein the M transmit modes are stored in a look-up table.

8. The system of claim 7, wherein the first transceiver includes an LUT to store the M transmit modes.

9. The system of claim 8, wherein the signal indicating the N transmit modes comprises transmit mode indices corresponding to the N transmit modes.

10. The system of claim 1, wherein the first and second transceivers form a multiple-in multiple-out (MIMO) system.

11. The system of claim 10, wherein each of the M transmit modes has a corresponding threshold post-processing mean signal-to-interference-and-noise ratios (SINRs).

12. The system of claim 11, wherein the channel quality module is operative to compare the channel quality statistic to the threshold post-processing mean SINRs corresponding to the M transmit modes and select the N transmit modes in response to said comparison.

13. The system of claim 12, wherein the channel quality module statistic comprises an estimated mean SINR.

14. The system of claim 12, wherein the channel quality statistic comprises an outage SINR.

15. The system of claim 11, wherein the M transmit modes are stored in a look-up table.

16. The system of claim 15, wherein the look-up table comprises a set of transmit modes for each of a plurality of spatial multiplexing rates.

17. The system of claim 16, wherein the lookup table with threshold post-processing mean SINRs are based on a generalized reference channel model.

18. The system of claim 17, wherein the generalized reference channel model comprises an orthogonal channel model.

19. The system of claim 17, wherein the generalized reference channel model comprises an Identically Distributed (IID) channel model.

20. The system of claim 1, wherein the first and second transceivers form a single-in single-out (SISO) system.

21. The system of claim 1, wherein the first and second transceivers form a single-in multiple-out (SIMO) system.

22. The system of claim 1, wherein the first and second transceivers form a multiple-in single-out (MISO) system.

23. The system of claim 1, wherein the second transceiver further comprises a transmit module operative to transmit a signal indicating R prohibited transmit modes, where R=M−N.

24. The system of claim 23, wherein the signal indicating the R prohibited transmit modes comprises one of indices to a table, memory addresses, and the R prohibited transmit modes.

25. The system of claim 1, wherein the signal indicating the N transmit modes is part of an acknowledgment (ACK) or no acknowledgment (NACK) signal.

26. The system of claim 1, wherein N>2.

27. A system comprising:
a first transceiver including means for transmitting signals in accordance with a first transmit mode over a channel;
a second transceiver including:
means for receiving the signals,
means for determining a channel quality statistic from the signals,
means for selecting N transmit modes from M transmit modes based on the determined channel quality statistic, where M>N and where N>1; and
means for transmitting a signal indicating the N transmit modes to the first transceiver; and
means for transmitting signals in accordance with a first one of the N transmit modes in response to receiving the signal indicating the N transmit modes from the second transceiver, and transmitting signals in accordance with a second one of the N transmit modes in response to an indication that the signal transmitted in the first one of the N transmit modes was not received at the second transceiver, wherein the first one of the N transmit modes is associated with a data rate higher than a data rate associated with the second one of the N transmit modes.

28. The system of claim 27, wherein the signal indicating the N transmit modes comprises the N transmit modes.

29. The system of claim 27, wherein the signal indicating the N transmit modes comprises indices to a table.

30. The system of claim 27, wherein the signal indicating the N transmit modes comprises one or more memory addresses.

31. The system of claim 27, wherein the first transceiver further comprises means for continuing to transmit signals in accordance with the first one of the N transmit modes in response to an indication that the signal transmitted in said first one of the N transmit modes was received at the second transceiver.

32. The system of claim 31, wherein said indication comprises an acknowledgement (ACK) signal sent by the second transmitter.

33. The system of claim 27, wherein the M transmit modes are stored in a look-up table.

34. The system of claim 33, wherein the first transceiver includes an LUT to store the M transmit modes.

35. The system of claim 34, wherein the signal indicating the N transmit modes comprises transmit mode indices corresponding to the N transmit modes.

36. The system of claim 27, wherein the first and second transceivers form a multiple-in multiple-out (MIMO) system.

37. The system of claim 36, wherein each of the M transmit modes has a corresponding threshold post-processing mean signal-to-interference-and-noise ratios (SINRs).

38. The system of claim 37, wherein the means for determining the channel quality statistic further comprises means for comparing the channel quality statistic to the threshold post-processing mean SINRs corresponding to the M transmit modes and select the N transmit modes in response to said comparison.

39. The system of claim 38, wherein the channel quality module statistic comprises an estimated mean SINR.

40. The system of claim 38, wherein the channel quality statistic comprises an outage SINR.

41. The system of claim 37, wherein the M transmit modes are stored in a look-up table.

42. The system of claim 41, wherein the look-up table comprises a set of transmit modes for each of a plurality of spatial multiplexing rates.

43. The system of claim 42, wherein the lookup table with threshold post-processing mean SINRs are based on a generalized reference channel model.

44. The system of claim 43, wherein the generalized reference channel model comprises an orthogonal channel model.

45. The system of claim 43, wherein the generalized reference channel model comprises an Identically Distributed (IID) channel model.

46. The system of claim 27, wherein the first and second transceivers form a single-in single-out (SISO) system.

47. The system of claim 27, wherein the first and second transceivers form a single-in multiple-out (SIMO) system.

48. The system of claim 27, wherein the first and second transceivers form a multiple-in single-out (MISO) system.

49. The system of claim 27, wherein the second transceiver further comprises means for transmitting a signal indicating R prohibited transmit modes, where R=M−N.

50. The system of claim 49, wherein the signal indicating the R prohibited transmit modes comprises one of indices to a table, memory addresses, and the R prohibited transmit modes.

51. The system of claim 27, wherein the signal indicating the N transmit modes is part of an acknowledgment (ACK) or no acknowledgment (NACK) signal.

52. The system of claim 27, wherein N>2.

53. An apparatus comprising:
a transceiver including:
a transmit module operative to transmit signals in accordance with a first transmit mode over a channel; and
a receive module operative to receive a signal indicating N transmit modes selected from M transmit modes based on a determined channel quality statistic, where M>N and where N>1;
the transceiver being operative to transmit signals in accordance with a first one of the N transmit modes in response to receiving the signal indicating the N transmit modes, and transmit signals in accordance with a second one of the N transmit modes in response to an indication that the signal transmitted in the first one of the N transmit modes was not received at a second transceiver, wherein the first one of the N transmit modes is associated with a data rate higher than a data rate associated with the second one of the N transmit modes.

54. The apparatus of claim 53, wherein the signal indicating the N transmit modes comprises the N transmit modes.

55. The apparatus of claim 53, wherein the signal indicating the N transmit modes comprises indices to a table.

56. The apparatus of claim 53, wherein the signal indicating the N transmit modes comprises one or more memory addresses.

57. The apparatus of claim 53, wherein the transceiver is operative to continue to transmit signals in accordance with the first one of the N transmit modes in response to an indication that the signal transmitted in said first one of the N transmit modes was received at a second transceiver.

58. The apparatus of claim 57, wherein said indication comprises an acknowledgement (ACK) signal sent by the second transmitter.

59. The apparatus of claim 53, wherein the M transmit modes are stored in a look-up table.

60. The apparatus of claim 59, wherein the first transceiver include an LUT to store the M transmit modes.

61. The apparatus of claim 60, wherein the signal indicating the N transmit modes comprises transmit mode indices corresponding to the N transmit modes.

62. The apparatus of claim 59, wherein the transceiver forms part of a multiple-in multiple-out (MIMO) system including the transceiver and a second transceiver.

63. The apparatus of claim 62, wherein each of the M transmit modes has a corresponding threshold post-processing mean signal-to-interference-and-noise ratios (SINRs).

64. The apparatus of claim 59, wherein the look-up table comprises a set of transmit modes for each of a plurality of spatial multiplexing rates.

65. The apparatus of claim 63, wherein the lookup table with threshold post-processing mean SINRs are based on a generalized reference channel model.

66. The apparatus of claim 65, wherein the generalized reference channel model comprises an orthogonal channel model.

67. The apparatus of claim 65, wherein the generalized reference channel model comprises an Identically Distributed (IID) channel model.

68. The apparatus of claim 53, wherein the transceivers forms part of a single-in single-out (SISO) system.

69. The apparatus of claim 53, wherein the transceiver forms part of a single-in multiple-out (SIMO) system.

70. The apparatus of claim 53, wherein the transceiver forms a multiple-in single-out (MISO) system.

71. The apparatus of claim 53, wherein the signal indicating the N transmit modes is part of an acknowledgment (ACK) or no acknowledgment (NACK) signal.

72. The apparatus of claim 53, wherein N>2.

73. An apparatus comprising:
a transceiver including:
means for transmitting signals in accordance with a first transmit mode over a channel,
means for receiving a signal indicating N transmit modes selected from M transmit modes based on a determined channel quality statistic, where M>N and where N>1, and
means for transmitting signals in accordance with a first one of the N transmit modes in response to receiving the signal indicating the N transmit modes, and transmitting signals in accordance with a second one of the N transmit modes in response to an indication that the signal transmitted in the first one of the N transmit modes was not received at a second transceiver, the first one of the N transmit modes being associated with a data rate higher than a data rate associated with the second one of the transmit modes.

74. The apparatus of claim 73, wherein the signal indicating the N transmit modes comprises the N transmit modes.

75. The apparatus of claim 73, wherein the signal indicating the N transmit modes comprises indices to a table.

76. The apparatus of claim 73, wherein the signal indicating the N transmit modes comprises one or more memory addresses.

77. The apparatus of claim 73, wherein the transceiver further comprises means for continuing to transmit signals in accordance with the first one of the N transmit modes in response to an indication that the signal transmitted in said first one of the N transmit modes was received at a second transceiver.

78. The apparatus of claim 77, wherein said indication comprises an acknowledgement (ACK) signal sent by the second transmitter.

79. The apparatus of claim 73, wherein the M transmit modes are stored in a look-up table.

80. The apparatus of claim 79, wherein the transceiver includes an LUT to store the M transmit modes.

81. The apparatus of claim 80, wherein the signal indicating the N transmit modes comprises transmit mode indices corresponding to the N transmit modes.

82. The apparatus of claim 79, wherein the transceiver forms part of a multiple-in multiple-out (MIMO) system including the transceiver and a second transceiver.

83. The apparatus of claim 82, wherein each of the M transmit modes has a corresponding threshold post-processing mean signal-to-interference-and-noise ratios (SINRs).

84. The apparatus of claim 79, wherein the look-up table comprises a set of transmit modes for each of a plurality of spatial multiplexing rates.

85. The apparatus of claim 83, wherein the lookup table with threshold post-processing mean SINRs are based on a generalized reference channel model.

86. The apparatus of claim 85, wherein the generalized reference channel model comprises an orthogonal channel model.

87. The apparatus of claim 85, wherein the generalized reference channel model comprises an Identically Distributed (IID) channel model.

88. The apparatus of claim 73, wherein the transceivers forms part of a single-in single-out (SISO) system.

89. The apparatus of claim 73, wherein the transceiver forms part of a single-in multiple-out (SIMO) system.

90. The apparatus of claim 73, wherein the transceiver forms a multiple-in single-out (MISO) system.

91. The apparatus of claim 73, wherein the signal indicating the N transmit modes is part of an acknowledgment (ACK) or no acknowledgment (NACK) signal.

92. The apparatus of claim 73, wherein N>2.

93. An apparatus comprising:
a transceiver including:
a channel quality module operative to determine a channel quality statistic from one or more received signals,
a selection module operative to select N transmit modes from M transmit modes based on the determined channel quality statistic, where M>N and where N>1; and
a transmit module operative to transmit a signal indicating the N transmit modes to a second, different transceiver;
wherein the transceiver is operative to receive signals in accordance with a first one of the N transmit modes from the second transceiver in response to the signal indicating the N transmit modes, and, in response to not receiving the signals in accordance with a first one of the N transmit modes, receiving signals in accordance with a second one of the N transmit modes, the first one of the N transmit modes being associated with a data rate higher than a data rate associated with a second one of the N transmit modes.

94. The apparatus of claim 93, wherein the signal indicating the N transmit modes comprises the N transmit modes.

95. The apparatus of claim 93, wherein the signal indicating the N transmit modes comprises indices to a table.

96. The apparatus of claim 93, wherein the signal indicating the N transmit modes comprises one or more memory addresses.

97. The apparatus of claim 93, wherein the M transmit modes are stored in a look-up table.

98. The apparatus of claim 97, wherein the signal indicating the N transmit modes comprises transmit mode indices corresponding to the N transmit modes.

99. The apparatus of claim 93, wherein the transceiver forms part of a multiple-in multiple-out (MIMO) system.

100. The apparatus of claim 99, wherein each of the M transmit modes has a corresponding threshold post-processing mean signal-to-interference-and-noise ratios (SINRs).

101. The apparatus of claim 100, wherein the channel quality module is operative to compare the channel quality statistic to the threshold post-processing mean SINRs corresponding to the M transmit modes and select the N transmit modes in response to said comparison.

102. The apparatus of claim 101, wherein the channel quality module statistic comprises an estimated mean SINR.

103. The apparatus of claim 101, wherein the channel quality statistic comprises an outage SINR.

104. The apparatus of claim 100, wherein the M transmit modes are stored in a look-up table.

105. The apparatus of claim 104, wherein the look-up table comprises a set of transmit modes for each of a plurality of spatial multiplexing rates.

106. The apparatus of claim 105, wherein the lookup table with threshold post-processing mean SINRs are based on a generalized reference channel model.

107. The apparatus of claim 106, wherein the generalized reference channel model comprises an orthogonal channel model.

108. The apparatus of claim 106, wherein the generalized reference channel model comprises an Identically Distributed (IID) channel model.

109. The apparatus of claim 93, wherein the transceiver forms part of a single-in single-out (SISO) system.

110. The apparatus of claim 93, wherein the transceiver forms part of a single-in multiple-out (SIMO) system.

111. The apparatus of claim 93, wherein the transceiver forms part of a multiple-in single-out (MISO) system.

112. The apparatus of claim 93, wherein the transceiver further comprises a transmit module operative to transmit a signal indicating R prohibited transmit modes, where R=M−N.

113. The apparatus of claim 112, wherein the signal indicating the R prohibited transmit modes comprises one of indices to a table, memory addresses, and the R prohibited transmit modes.

114. The apparatus of claim 93, wherein the signal indicating the N transmit modes is part of an acknowledgment (ACK) or no acknowledgment (NACK) signal.

115. The apparatus of claim 93, wherein N>2.

116. An apparatus comprising:
a transceiver including:
means for determining a channel quality statistic from one or more received signals,
means for selecting N transmit modes from M transmit modes based on the determined channel quality statistic, where M>N and where N>1;
means for transmitting a signal indicating the N transmit modes to a second, different transceiver; and
means for receiving signals in accordance with a first one of the N transmit modes from the second transceiver in response to the signal indicating the N transmit modes, and, in response to not receiving the signals in accordance with a first one of the N transmit modes, receiving signals in accordance with a second one of the N transmit modes, the first one of the N transmit modes being associated with a data rate higher than a data rate associated with a second one of the N transmit modes.

117. The apparatus of claim 116, wherein the signal indicating the N transmit modes comprises the N transmit modes.

118. The apparatus of claim 116, wherein the signal indicating the N transmit modes comprises indices to a table.

119. The apparatus of claim 116, wherein the signal indicating the N transmit modes comprises one or more memory addresses.

120. The apparatus of claim 116, wherein the M transmit modes are stored in a look-up table.

121. The apparatus of claim 120, wherein the signal indicating the N transmit modes comprises transmit mode indices corresponding to the N transmit modes.

122. The apparatus of claim 116, wherein the transceiver forms part of a multiple-in multiple-out (MIMO) system.

123. The apparatus of claim 122, wherein each of the M transmit modes has a corresponding threshold post-processing mean signal-to-interference-and-noise ratios (SINRs).

124. The apparatus of claim 123, wherein the means for determining the channel quality statistic further comprises means for comparing the channel quality statistic to the threshold post-processing mean SINRs corresponding to the M transmit modes and select the N transmit modes in response to said comparison.

125. The apparatus of claim 124, wherein the channel quality module statistic comprises an estimated mean SINR.

126. The apparatus of claim 124, wherein the channel quality statistic comprises an outage SINR.

127. The apparatus of claim 123, wherein the M transmit modes are stored in a look-up table.

128. The apparatus of claim 127, wherein the look-up table comprises a set of transmit modes for each of a plurality of spatial multiplexing rates.

129. The apparatus of claim 128, wherein the lookup table with threshold post-processing mean SINRs are based on a generalized reference channel model.

130. The apparatus of claim 129, wherein the generalized reference channel model comprises an orthogonal channel model.

131. The apparatus of claim 129, wherein the generalized reference channel model comprises an Identically Distributed (IID) channel model.

132. The apparatus of claim 116, wherein the transceiver forms part of a single-in single-out (SISO) system.

133. The apparatus of claim 116, wherein the transceiver forms part of a single-in multiple-out (SIMO) system.

134. The apparatus of claim 116, wherein the transceiver further comprises means for transmitting a signal indicating R prohibited transmit modes, where R=M−N.

135. The apparatus of claim 134, wherein the signal indicating the R prohibited transmit modes comprises one of indices to a table, memory addresses, and the R prohibited transmit modes.

136. The apparatus of claim 116, wherein the transceiver forms part of a multiple-in single-out (MISO) system.

137. A method comprising:
transmitting signals from a first transceiver in accordance with a first transmit mode over a channel;
receiving the signals at a second transceiver;
determining a channel quality statistic from the signals;
selecting N transmit modes from M transmit modes based on the determined channel quality statistic, where M>N and where N>1;
transmitting a signal indicating the N transmit modes to the first transceiver;
transmitting signals from the first transceiver in accordance with a first one of the N transmit modes in response to receiving the signal indicating the N transmit modes from the second transceiver; and
transmitting signals from the first transceiver in accordance with a second one of the N transmit modes in response to an indication that the signal transmitted in the first one of the N transmit modes was not received at the second transceiver, wherein the first one of the N transmit modes is associated with a data rate higher than a data rate associated with the second one of the N transmit modes.

138. The method of claim 137, wherein the signal indicating the N transmit modes comprises the N transmit modes.

139. The method of claim 137, wherein the signal indicating the N transmit modes comprises indices to a table.

140. The method of claim 137, wherein the signal indicating the N transmit modes comprises one or more memory addresses.

141. The method of claim 137, further comprising continuing to transmit signals from the first transceiver in accordance with the first one of the N transmit modes in response to an indication that the signal transmitted in said first one of the N transmit modes was received at the second transceiver.

142. The method of claim 141, wherein said indication comprises an acknowledgement (ACK) signal sent by the second transmitter.

143. The method of claim 137, wherein each of the M transmit modes has a corresponding threshold post-processing mean signal-to-interference-and-noise ratios (SINRs).

144. The method of claim 143, wherein said determining the channel quality statistic further comprises comparing the channel quality statistic to the threshold post-processing mean SINRs corresponding to the M transmit modes and select the N transmit modes in response to said comparison.

145. The method of claim 144, wherein the channel quality module statistic comprises an estimated mean SINR.

146. The method of claim 144, wherein the channel quality statistic comprises an outage SINR.

147. The method of claim 137, further comprising transmitting a signal indicating R prohibited transmit modes, where R=M−N.

148. The method of claim 147, wherein the signal indicating the R prohibited transmit modes comprises one of indices to a table, memory addresses, and the R prohibited transmit modes.

149. The method of claim 137, wherein the signal indicating the N transmit modes is part of an acknowledgment (ACK) or no acknowledgment (NACK) signal.

150. The method of claim 137, wherein N>2.

151. A method comprising:
transmitting signals in accordance with a first transmit mode over a channel;
receiving a signal indicating N transmit modes selected from M transmit modes based on a determined channel quality statistic, where M>N and where N>1;
transmitting signals in accordance with a first one of the N transmit modes in response to receiving the signal indicating the N transmit modes; and
transmitting signals in accordance with a second one of the N transmit modes in response to an indication that the signal transmitted in the first one of the N transmit modes was not received at a second transceiver, wherein the first one of the N transmit modes is associated with a data rate higher than a data rate associated with the second one of the N transmit modes.

152. The method of claim 151, wherein the signal indicating the N transmit modes comprises the N transmit modes.

153. The method of claim 151, wherein the signal indicating the N transmit modes comprises indices to a table.

154. The method of claim 151, wherein the signal indicating the N transmit modes comprises one or more memory addresses.

155. The method of claim 151, further comprising continuing to transmit signals in accordance with the first one of the N transmit modes in response to an indication that the signal transmitted in said first one of the N transmit modes was received at a second transceiver.

156. The method of claim 155, wherein said indication comprises an acknowledgement (ACK) signal sent by the second transmitter.

157. The method of claim 151, wherein the M transmit modes are stored in a look-up table.

158. The method of claim 151, wherein the signal indicating the N transmit modes comprises transmit mode indices corresponding to the N transmit modes.

159. The method of claim 151, wherein each of the M transmit modes has a corresponding threshold post-processing mean signal-to-interference-and-noise ratios (SINRs).

160. The method of claim 151, wherein the signal indicating the N transmit modes is part of an acknowledgment (ACK) or no acknowledgment (NACK) signal.

161. The method of claim 151, wherein N>2.

162. A method comprising:
receiving signals transmitted in accordance with a first transmit mode over a channel;
determining a channel quality statistic from the one or more signals received over a channel;
selecting N transmit modes from M transmit modes based on the determined channel quality statistic, where M>N and where N>1;
transmitting a signal indicating the N transmit modes to a transceiver that transmitted the received signals;
receiving signals in accordance with a second one of the N transmit modes;
wherein the signals in accordance with the second one of the N transmit modes are transmitted in response to an indication that signals in accordance with the first one of the N transmit modes were not received, and
wherein the first one of the N transmit modes is associated with a data rate higher than a data rate associated with a second one of the N transmit modes.

163. The method of claim 162, wherein the signal indicating the N transmit modes comprises the N transmit modes.

164. The method of claim 162, wherein the signal indicating the N transmit modes comprises indices to a table.

165. The method of claim 162, wherein the signal indicating the N transmit modes comprises one or more memory addresses.

166. The method of claim 162, wherein the signal indicating the N transmit modes comprises transmit mode indices corresponding to the N transmit modes.

167. The method of claim 162, wherein each of the M transmit modes has a corresponding threshold post-processing mean signal-to-interference-and-noise ratios (SINRs).

168. The method of claim 167, wherein said determining the channel quality statistic further comprises comparing the channel quality statistic to the threshold post-processing mean SINRs corresponding to the M transmit modes and select the N transmit modes in response to said comparison.

169. The method of claim 168, wherein the channel quality module statistic comprises an estimated mean SINR.

170. The method of claim 168, wherein the channel quality statistic comprises an outage SINR.

171. The method of claim 167, wherein the M transmit modes are stored in a look-up table.

172. The method of claim 162, further comprising transmitting a signal indicating R prohibited transmit modes, where R=M−N.

173. The method of claim 172, wherein the signal indicating the R prohibited transmit modes comprises one of indices to a table, memory addresses, and the R prohibited transmit modes.

174. The method of claim 162, wherein the signal indicating the N transmit modes is part of an acknowledgment (ACK) or no acknowledgment (NACK) signal.

175. The method of claim 162, wherein N>2.

176. A non-transitory computer-readable medium having instructions stored thereon, which, when executed by a processor, causes the processor to perform operations comprising:

determining a channel quality statistic from signals transmitted from a first transceiver in accordance with a first transmit mode over a channel and received at a second transceiver;

selecting N transmit modes from M transmit modes based on the determined channel quality statistic, where M>N and where N>1;

generating a signal indicating the N transmit modes for transmission to the first transceiver; and controlling the first transceiver to transmit signals in accordance with a first one of the N transmit modes in response to receiving the signal indicating the N transmit modes from the second transceiver, and transmit signals in accordance with a second one of the N transmit modes in response to an indication that the signal transmitted in the first one of the N transmit modes was not received at the second transceiver, wherein the first one of the N transmit modes is associated with a data rate higher than a data rate associated with the second one of the N transmit modes.

177. The computer-readable medium of claim 176, wherein the signal indicating the N transmit modes comprises the N transmit modes.

178. The computer-readable medium of claim 176, wherein the signal indicating the N transmit modes comprises indices to a table.

179. The computer-readable medium of claim 176, wherein the signal indicating the N transmit modes comprises one or more memory addresses.

180. The computer-readable medium of claim 176, further comprising controlling the first transceiver to continue to transmit signals from the first transceiver in accordance with the first one of the N transmit modes in response to an indication that the signal transmitted in said first one of the N transmit modes was received at the second transceiver.

181. The computer-readable medium of claim 180, wherein said indication comprises an acknowledgement (ACK) signal sent by the second transmitter.

182. The computer-readable medium of claim 176, wherein each of the M transmit modes has a corresponding threshold post-processing mean signal-to-interference-and-noise ratios (SINRs).

183. The computer-readable medium of claim 182, wherein said determining the channel quality statistic further comprises comparing the channel quality statistic to the threshold post-processing mean SINRs corresponding to the M transmit modes and select the N transmit modes in response to said comparison.

184. The computer-readable medium of claim 183, wherein the channel quality module statistic comprises an estimated mean SINR.

185. The computer-readable medium of claim 183, wherein the channel quality statistic comprises an outage SINR.

186. The computer-readable medium of claim 176, further comprising controlling the first transceiver to transmit a signal indicating R prohibited transmit modes, where R=M−N.

187. The computer-readable medium of claim 186, wherein the signal indicating the R prohibited transmit modes comprises one of indices to a table, memory addresses, and the R prohibited transmit modes.

188. The computer-readable medium of claim 176, wherein the signal indicating the N transmit modes is part of an acknowledgment (ACK) or no acknowledgment (NACK) signal.

189. The computer-readable medium of claim 176, wherein N>2.

190. A non-transitory computer-readable medium having instructions stored thereon, which, when executed by a processor, causes the processor to perform operations comprising:

controlling a first transceiver to transmit signals in accordance with a first transmit mode over a channel;

controlling the first transceiver to transmit signals in accordance with a first one of the N transmit modes in response to a signal indicating the N transmit modes selected from M transmit modes at a second transceiver based on a determined channel quality statistic, where M>N and where N>1; and controlling the first transceiver to transmit signals in accordance with a second one of the N transmit modes in response to an indication that the signal transmitted in the first one of the N transmit modes was not received at a second transceiver, wherein the first one of the N transmit modes is associated with a data rate higher than a data rate associated with the second one of the N transmit modes.

191. The computer-readable medium of claim 190, wherein the signal indicating the N transmit modes comprises the N transmit modes.

192. The computer-readable medium of claim 190, wherein the signal indicating the N transmit modes comprises indices to a table.

193. The computer-readable medium of claim 190, wherein the signal indicating the N transmit modes comprises one or more memory addresses.

194. The computer-readable medium of claim 190, further comprising controlling the first transceiver to continue to transmit signals in accordance with the first one of the N transmit modes in response to an indication that the signal transmitted in said first one of the N transmit modes was received at a second transceiver.

195. The computer-readable medium of claim 194, wherein said indication comprises an acknowledgement (ACK) signal sent by the second transmitter.

196. The computer-readable medium of claim 190, wherein the M transmit modes are stored in a look-up table.

197. The computer-readable medium of claim 190, wherein the signal indicating the N transmit modes comprises transmit mode indices corresponding to the N transmit modes.

198. The computer-readable medium of claim 190, wherein each of the M transmit modes has a corresponding threshold post-processing mean signal-to-interference-and-noise ratios (SINRs).

199. The computer-readable medium of claim 190, wherein the signal indicating the N transmit modes is part of an acknowledgment (ACK) or no acknowledgment (NACK) signal.

200. The computer-readable medium of claim 190, wherein N>2.

201. A non-transitory computer-readable medium having instructions stored thereon, which, when executed by a processor, causes the processor to perform operations comprising:
  determining a channel quality statistic from signals transmitted over a channel;
  selecting N transmit modes from M transmit modes based on the determined channel quality statistic, where M>N and where N>1; and
  controlling a transceiver to transmit a signal indicating the N transmit modes to a second, different transceiver that transmitted signals in accordance with the first transmit mode;
  receiving signals in accordance with a first one of the N transmit modes from the second transceiver in response to the signal indicating the N transmit modes, and, in response to not receiving the signals in accordance with a first one of the N transmit modes, receiving signals in accordance with a second one of the N transmit modes, the first one of the N transmit modes being associated with a data rate higher than a data rate associated with a second one of the N transmit modes.

202. The computer-readable medium of claim 201, wherein the signal indicating the N transmit modes comprises the N transmit modes.

203. The computer-readable medium of claim 201, wherein the signal indicating the N transmit modes comprises indices to a table.

204. The computer-readable medium of claim 201, wherein the signal indicating the N transmit modes comprises one or more memory addresses.

205. The computer-readable medium of claim 201, wherein the signal indicating the N transmit modes comprises transmit mode indices corresponding to the N transmit modes.

206. The computer-readable medium of claim 201, wherein each of the M transmit modes has a corresponding threshold post-processing mean signal-to-interference-and-noise ratios (SINRs).

207. The computer-readable medium of claim 206, wherein said determining the channel quality statistic further comprises comparing the channel quality statistic to the threshold post-processing mean SINRs corresponding to the M transmit modes and select the N transmit modes in response to said comparison.

208. The computer-readable medium of claim 207, wherein the channel quality module statistic comprises an estimated mean SINR.

209. The computer-readable medium of claim 207, wherein the channel quality statistic comprises an outage SINR.

210. The computer-readable medium of claim 206, wherein the M transmit modes are stored in a look-up table.

211. The computer-readable medium of claim 201, further comprising controlling a transceiver to transmitting a signal indicating R prohibited transmit modes to the transceiver that transmitted signals in accordance with the first transmit mode, where R=M−N.

212. The computer-readable medium of claim 211, wherein the signal indicating the R prohibited transmit modes comprises one of indices to a table, memory addresses, and the R prohibited transmit modes.

213. The computer-readable medium of claim 201, wherein the signal indicating the N transmit modes is part of an acknowledgment (ACK) or no acknowledgment (NACK) signal.

214. The computer-readable medium of claim 201, wherein N>2.

215. An apparatus comprising:
  a transceiver including:
    a transmit module operative to transmit signals in accordance with a first transmit mode over a channel, and
    a receive module operative to receive a signal indicating R prohibited transmit modes selected from M transmit modes based on a determined channel quality statistic, where M>R,
  the transceiver being operative to transmit signals to a second, different transceiver in accordance with a first permitted transmit mode other than any of the R prohibited transmit modes in response to receiving the signal indicating the R prohibited transmit modes, and transmit signals in accordance with a second permitted transmit mode other than any of the R prohibited transmit modes in response to an indication that the signal transmitted in accordance with a first permitted transmit mode was not received at the second transceiver, the first permitted transmit mode being associated with a data rate higher than a data rate associated with the second permitted transmit mode.

216. The apparatus of claim 215, wherein the signal indicating the R prohibited transmit modes comprises one of indices to a table, memory addresses, and the R prohibited transmit modes.

217. The apparatus of claim 116, wherein the signal indicating the N transmit modes is part of an acknowledgment (ACK) or no acknowledgment (NACK) signal.

218. The apparatus of claim 116, wherein N>2.

219. An apparatus comprising:
  a transceiver including:
    means for transmitting signals in accordance with a first transmit mode over a channel,
    means for receiving a signal indicating R prohibited transmit modes selected from M transmit modes based on a determined channel quality statistic, where M>R, and
    means for transmitting signals to a second, different transceiver in accordance with a first permitted transmit mode other than any of the R prohibited transmit modes in response to receiving the signal indicating the R prohibited transmit modes, and transmit signals in accordance with a second permitted transmit mode other than any of the R prohibited transmit modes in response to an indication that the signal transmitted in accordance with a first permitted transmit mode was not received at the second transceiver, the first permitted transmit mode being associated with a data rate higher than a data rate associated with the second permitted transmit mode.

220. The apparatus of claim 219, wherein the signal indicating the R prohibited transmit modes comprises one of indices to a table, memory addresses, and the R prohibited transmit modes.

221. A method comprising:
  transmitting signals in accordance with a first transmit mode over a channel;
  receiving a signal indicating R prohibited transmit modes selected from M transmit modes based on a determined channel quality statistic, where M>R;
  transmitting signals in accordance with a first permitted transmit mode other than any of the R prohibited transmit modes in response to receiving the signal indicating the R prohibited transmit modes; and transmitting signals in accordance with a second permitted transmit mode other than any of the R prohibited transmit modes in response to an indication that the signal transmitted in accordance with a first permitted transmit mode was not received at the second transceiver, the first permitted transmit mode being associated with a data rate higher than a data rate associated with the second permitted transmit mode.

222. The method of claim 221, wherein the signal indicating the R prohibited transmit modes comprises one of indices to a table, memory addresses, and the R prohibited transmit modes.

223. A non-transitory computer-readable medium having instructions stored thereon, which, when executed by a processor, causes the processor to perform operations comprising:
controlling a first transceiver to transmit signals in accordance with a first transmit mode over a channel;
controlling the first transceiver to transmit signals in accordance with a first permitted transmit mode other than any of R prohibited transmit modes in response to receiving a signal indicating R prohibited transmit modes selected from M transmit modes at a second transceiver based on a determined channel quality statistic, where M>R; and
controlling the first transceiver to transmit signals in accordance with a second permitted transmit mode other than any of the R prohibited transmit modes in response to an indication that the signal transmitted in accordance with a first permitted transmit mode was not received at the second transceiver, the first permitted transmit mode being associated with a data rate higher than a data rate associated with the second permitted transmit mode.

224. The computer-readable medium of claim 223, wherein the signal indicating the R prohibited transmit modes comprises one of indices to a table, memory addresses, and the R prohibited transmit modes.

* * * * *